(12) United States Patent
Kobylinski

(10) Patent No.: US 6,883,546 B1
(45) Date of Patent: Apr. 26, 2005

(54) LOCKABLE COMPRESSION PLUG ASSEMBLY FOR HERMETICALLY SEALING AN OPENING IN A PART, SUCH AS THE END OF A TUBULAR MEMBER

(76) Inventor: Thomas E. Kobylinski, 10030 County Rd., Clarence, NY (US) 14032

( * ) Notice: Subject to any disclaimer, the term of this patent is extended or adjusted under 35 U.S.C. 154(b) by 0 days.

(21) Appl. No.: 10/392,520

(22) Filed: Mar. 20, 2003

(51) Int. Cl.⁷ .......................... F16L 55/10; B65D 55/14
(52) U.S. Cl. ........................ 138/89; 138/90; 220/315; 215/273
(58) Field of Search ................. 277/602, 603, 277/608, 609, 628, 630, 637, 616; 285/305, 308, 312, 316; 138/89, 90; 166/92.1; 215/273; 220/315

(56) References Cited

U.S. PATENT DOCUMENTS

| | | | | |
|---|---|---|---|---|
| 1,065,896 A | * | 6/1913 | Carter | 215/207 |
| 1,099,158 A | * | 6/1914 | Baker | 138/89 |
| 2,155,491 A | * | 4/1939 | Jacobs | 138/89 |
| 2,245,887 A | * | 6/1941 | Wikander | 4/295 |
| 2,445,325 A | * | 7/1948 | Hemp | 215/307 |
| 2,479,862 A | * | 8/1949 | Payne | 215/359 |
| 2,493,452 A | * | 1/1950 | Grigg | 285/189 |
| 2,566,816 A | * | 9/1951 | Work | 220/210 |
| 2,644,610 A | * | 7/1953 | Work | 220/210 |
| 2,993,616 A | * | 7/1961 | Carlile, Jr. et al. | 220/235 |
| 3,130,571 A | * | 4/1964 | Neumann | 70/58 |
| 3,477,607 A | * | 11/1969 | Johnson, Jr. et al. | 220/210 |
| 3,618,809 A | * | 11/1971 | Martino | 220/235 |
| 3,812,810 A | * | 5/1974 | Moeller | 114/197 |
| 3,950,971 A | * | 4/1976 | Karls | 70/164 |
| 4,035,921 A | * | 7/1977 | Williams | 33/728 |
| 4,073,168 A | * | 2/1978 | Takada | 70/165 |
| 4,303,101 A | * | 12/1981 | Tholen | 138/89 |
| 4,411,312 A | | 10/1983 | English | 166/75.13 |
| 4,503,880 A | * | 3/1985 | Hochman | 137/377 |
| 4,683,597 A | * | 8/1987 | Taylor et al. | 4/295 |
| 4,848,458 A | | 7/1989 | Holdsworth et al. | 166/92.1 |
| 4,881,597 A | | 11/1989 | Hensley | 166/92.1 |
| D317,270 S | | 6/1991 | Hensley | D10/96 |
| D317,271 S | | 6/1991 | Hensley | D10/96 |
| 5,035,265 A | * | 7/1991 | Chen | 138/89 |
| D329,687 S | | 9/1992 | Benson et al. | D23/249 |
| 5,307,841 A | | 5/1994 | Condon | 138/90 |
| 5,348,085 A | * | 9/1994 | Benson | 166/92.1 |
| D461,001 S | | 7/2002 | Hensley et al. | D23/260 |
| 6,419,104 B1 | | 7/2002 | Sarajian | 220/234 |
| 6,453,603 B1 | * | 9/2002 | Baker | 43/124 |
| 6,526,689 B1 | * | 3/2003 | Moore | 43/4 |

* cited by examiner

Primary Examiner—Patrick Brinson
(74) Attorney, Agent, or Firm—Patricia M. Costanzo

(57) ABSTRACT

A lockable assembly for hermetically sealing an opening consists of a threaded wing bolt, a domed capping plate having an annular axial hole and means for locking the assembly, an elastomeric sealing gasket, and a base plate having a threaded axial hole for receiving the threaded bolt. Positioning the gasket between the capping and base plates, the bolt is inserted through the assembly, then base plate first the assembly is inserted into the opening to be sealed. A flange on the gasket and the capping plate support the assembly on the rim of the opening to be sealed. Screwing the bolt into the assembly urges the plates toward one another compressing and deforming the gasket radially outward creating the seal. Accompanying frictional forces between the gasket and inner surface of the opening to be sealed along with the locking means prohibit the removal of the assembly by unauthorized persons.

20 Claims, 6 Drawing Sheets

LOCKABLE COMPRESSION PLUG ASSEMBLY FOR HERMETICALLY SEALING AN OPENING IN A PART, SUCH AS THE END OF A TUBULAR MEMBER

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE OR A COMPUTER PROGRAM LISTING COMPACT DISK APPENDIX

Not Applicable

BACKGROUND OF THE INVENTION

The present invention relates generally to improved seal devices and, particularly, to a locking compressible plug assembly for hermetically sealing an opening in a part and locking the seal so formed.

The background information discussed below is presented to better illustrate the novelty of the present invention. This background information is not admitted prior art.

The problems presented by openings or holes in parts or devices, and attempts to solve these problems, i.e., the use of plugs or stoppers to seal the openings, have a long history. For example, in the age-old profession of wine and spirits making, "bung holes", the holes drilled into beech wood casks used in the fermentation process, required plugs. These plugs were often made of materials such as cork and wood that would, with age rot and/or dry and shrink. And, as alcohols are still aged in wooden casks having bung holes, there is still a need for secure, reliable stoppers. As time and technology progresses, however, both the kinds of holes that need plugging and the means to plug those holes are becoming more sophisticated, and the need for a tight seal more demanding.

The plumbing industry is especially demanding in its needs for sealing plugs. Plumbers require sealing plugs when testing for leaks in drain and vent pipes and in the pipe connections of a plumbing system. To conduct mandated pressure tests, plumbers need plugs or stoppers to seal drain, waste, or vent pipes so that these pipes can be tested for their ability to withstand the predetermined internal pressures. In addition, plumbers, especially those that service the plumbing in our homes, have a need for inexpensive, yet reliable, plugs so that they can achieve the air-tight and liquid-tight conditions required for successful "plugging". The pipes with which plumbing is constructed come in various sizes and are made of various materials, including cast iron, copper, clay, and polyvinylchloride accordingly the plugs and stoppers must be able to create the needed seal regardless of the size of the pipe or the material of which the piping is made.

The insulation industry also has a need for hermetically sealing plugs to plug the holes that are drilled into the side of houses and mobile homes during the installation of insulation material. After holes are drilled through which the insulation is installed, the holes must be plugged to protect the insulation from the environment and to keep it inside the wall space.

Containers, such as bottles, and especially containers carrying explosive or toxic materials require stoppers that will prevent their accidental removal and that will not allow the material to leak out of the container, especially during shipping.

The coating industry often is faced with applying a coating to parts, such as piping, but there are times when the coating must not be applied to the internal surface of the pipes. For example, when the coating would be incompatible with the fluids or gases that will come into contact with the internal surface area of the pipe, the internal surfaces of the pipe must be sealed off during the coating procedure. Thus, there is a need for the means to mask or to close the openings to prevent coating material from coming into contact with those parts that are not to be coated.

Environmental ground water monitoring requires not only tight sealing plugs, but also plugs that have the ability to be locked. When a spill is reported by a gas station, such as a leakage of gasoline from the station's underground gasoline storage tanks, for example, environmental regulations now require that monitoring wells be installed in the area of concern. The wells are used to collect ground water samples to first determine the extent of the spill and, subsequently, to monitor the success of the clean-up efforts or of the containment program.

Once a monitoring well is put into place, samples of ground water from each well are collected for testing to see if the contaminant is present in the ground water that flows into that well. It is well-accepted that this system works well, but only, of course, as long as no extraneous contaminant is allowed to enter into the well.

Often a monitoring well is placed in an area of heavy vehicular traffic. If a below-ground monitoring well opening is left uncapped, it is easy to understand how small amounts of gasoline, accidentally spilled onto the ground surface by a consumer filling his gas tank, could migrate beneath the ground surface and into the monitoring well. Thus, when a sample of water from that well is tested, the results would show the presence of gasoline in the groundwater, but there is no way to determine whether the gasoline had entered the well in ground water that was contaminated with gasoline from a leaking storage tanks or if the gasoline came from a small amount of surface run-off. Thus, monitoring wells need to be capped (plugged) to keep contaminants from entering the well.

Contamination can occur even when the well is capped. For instance, when the driver of a gasoline delivery truck mistakes the monitoring well inlet for a gas storage tank inlet and pumps the gasoline into the monitoring well. Such a mistake can lead to grave consequences as the gasoline mistakenly pumped into the monitoring well will quickly migrate away from the monitoring well and enter the ground water. In such a case, the need for a well cover that can be locked is apparent.

Sometimes the introduction of a contaminant into a monitoring well is deliberate. At best, this is done as a mischievous act; at worst, the motive is malevolent. In either case, deliberate contamination can destroy, at least a part of if not all of, a monitoring well program and could be prevented by the use of a hermetically sealed well cover that can be locked.

It is thus readily apparent that there is a need for an improved plug for pipes, a plug that can provide a hermetic seal, and that can be locked. There have been several attempts at fulfilling the need for a hermetically sealing plug that can be locked in the sealing position, but all such efforts to date have had serious drawbacks. Conventional plugs are available in many sizes and shapes and in many types of materials including, for example, cork, silicon, and rubber. Some are able to be locked.

Conventional plugs, however, provide a less-than-complete seal under certain circumstances. For instance, if a part has an opening into which a plug is inserted, and that part is to be heated, gas inside the void volume of the part will expand, potentially forcing the plug partially or completely out of the opening.

Another example occurs when the pipe end to be sealed is threaded. In this case, conventional plugs may form a less-than-complete seal around the threads, particularly where the threads are cut deeply into the walls forming the opening. This imperfect seal, especially in such a threaded opening, may permit liquids or gases to enter into, or if such is the case, escape from, the interior surface portions of the part by flowing along the incompletely plugged threads.

Conventional plugs that comprise an inflatable body are especially susceptible to leakage should the inflatable body develop a leak from any number of causes, including the body being over pressurized from either inside or outside of the body, where the body is exposed to caustic or acidic materials, or if the pipe, and thus the inflatable body, are subject to severe heating.

The construction of many of the conventional plugs is complex, thus the plugs are expensive to fabricate and assemble. In the cases where there are metal parts, these parts are subject to corrosion and subsequent failure. Some of the locking well caps have to be fitted around the top perimeter of the well piping and then cemented (grouted) in place, and in all cases the top of the sealing plug is flat. Flat topped plugs allow rain water or other fluids to remain on the top which would increase the physical or chemical weathering effects caused by the particular substance.

Some specialty plugs are designed to be totally water soluble, so that when the plug is no longer needed, it is broken inside the pipe and allowed to dissolve. This, of course, means that each plug can be used only one time.

Accordingly, it would be a significant improvement in the art to provide an improved sealing plug assembly that forms a hermetic seal between the plug and the interior surface of the opening to be sealed to prevent passage of liquids or gases through the sealing plug assembly with such plug being lockable so that only those who are entitled to break the seal and/or remove the plug can do so. The material used to manufacture an improved sealing assembly should allow the plug to expand if the opening that is sealed expands due to changes in environmental conditions or, alternatively, should permit the plug to contract if the sealed opening should contract. Additionally, an advantageously improved sealing assembly would be of simple construction, easy to make and use, reusable, not subject to rot or microbial degradation, would not transfer undesirable aromas and favors, and would be economical to manufacture.

SUMMARY

The present invention satisfies the current need in the art for an improved lockable compression plug assembly for hermetically sealing an opening in a part.

A lockable compression plug assembly for hermetically sealing an opening in a part is provided, where such assembly comprises a sealing means for hermetically sealing an opening in a part and, additionally, comprises a locking means for locking the sealing means in the opening to be sealed.

In a preferred embodiment, the lockable compression plug assembly for hermetically sealing an opening in a part, comprises:
 a threaded wing bolt;
 a compression capping plate having a first and a second side and an annular axial hole through which the threaded wing bolt is positioned;
 an annular elastomeric sealing gasket having a central opening through which the threaded wing bolt is positioned;
 a compression base plate having a first and a second side and a threaded annular axial bore for receiving the threaded part of the threaded wing bolt;
 wherein when the sealing gasket is positioned between the second side of the capping plate and the first side of the base plate and the threaded wing bolt is turned toward the compression plates, the compression plates are urged toward one another thereby compressing the gasket between the compression plates causing the gasket to deform radially outward thereby providing a hermetic seal in the opening to be sealed, where such seal also creates frictional forces between the inner surface of the opening in a part to be sealed and the expanded gasket such that the sealing assemble cannot be removed, as long as the gasket remains compressed.

Additionally, the lockable hermetically sealing assembly comprises a locking means which consists of a lock tab that is integral with the first side of the capping compression plate, with the lock tab having an aperture to receive a shackle of a padlock, so that upon locking the padlock, rotating the winged threaded bolt is prevented. This means that the compressed gasket of the sealing assembly cannot be decompressed, which prevents any unauthorized entrance to the sealed opening. Yet, once the lock is unlocked and removed from the locking aperture, the sealing assembly can be readily disengaged simply by turning the winged threaded bolt away from the compression plates, thus decompressing the gasket allowing the gasket to return to its pre-compressed diameter and, thus, allowing easy removal of the sealing assembly by authorized individuals.

Furthermore, a domed compression capping plate is provided for the lockable hermetically sealing assembly, whereby fluids are not able to collect and remain on the outer surface of said plate.

The compression capping plate of the lockable hermetically sealing assembly has an outer diameter greater than said opening in a part to be sealed and the flange of the annular elastomeric sealing gasket of the sealing assembly has the same size outer diameter, thereby permitting the sealing assembly to be supported by the rim of the opening to be sealed. Moreover the resilient, elastomeric sealing gasket provides for a tight seal over the rim of the opening of the seal regardless of the degree of smoothness of the surface of the rim, as the gasket will mold itself around and about any protuberances that may be present on the rim of the opening to be sealed.

The threaded wing bolt of the lockable hermetically sealing assembly has an end, opposite to the winged end, that is tapered, wherein said tapered end has at least one aperture, where such aperture has a multiplicity of desirable uses.

Furthermore, this invention also provides an assembly wherein the manufacturing of the assembly provides a sealing assembly of a limited number of parts, uniform tolerances, quality, dependability, having improved impact and corrosion resistance, and requiring little or no maintenance, wherein all of these benefits are provided at an afforded cost.

Still other benefits and advantages of this invention will become apparent to those skilled in the art upon reading and understanding the following detailed specifications and related drawings.

BRIEF DESCRIPTION OF THE DRAWINGS

In order that these and other objects, features, and advantages of the present invention, may be more fully comprehended, the invention will now be described, by way of example, with reference to the accompanying drawings, wherein like reference characters indicate like parts throughout the several figures, and in which.

A LIST OF THE REFERENCE NUMBERS AND RELATED PARTS OF THE INVENTION

Figure 1:
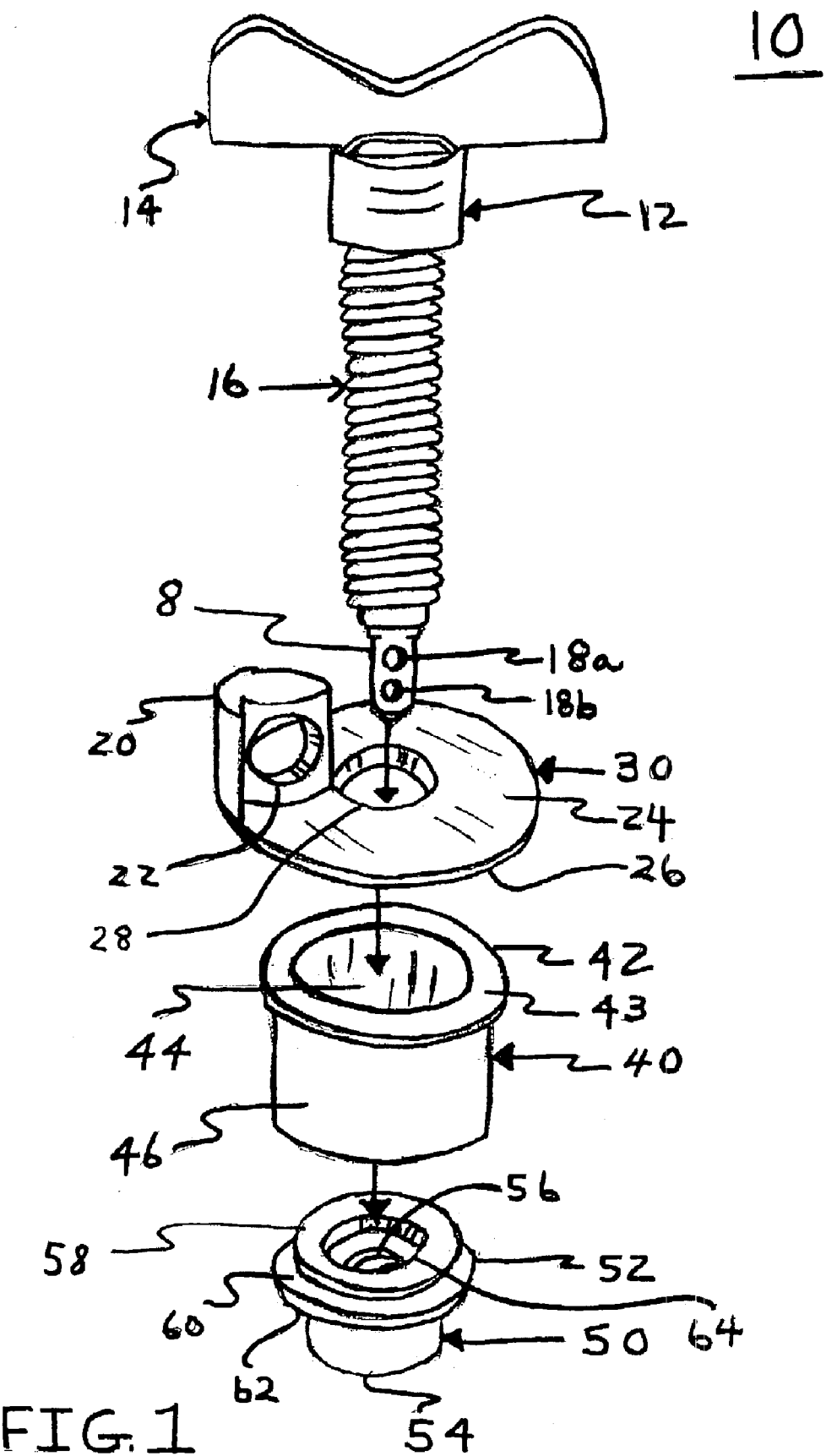
FIG. 1 is an exploded front perspective view of component parts of a lockable compression plug assembly made in accordance with this invention.

8 Tapered end of threaded wing bolt 12
10 Lockable compression plug sealing assembly
12 Threaded wing bolt
14 Wings of threaded wing bolt 12
16 Threads of threaded wing bolt 12
18a First optional small hole in tapered end of threaded wing bolt 12
18b Second optional small hole in tapered end of threaded wing bolt 12
20 T-shaped ear lug locking means integral with domed compression capping plate 30
22 Hole in t-shaped locking part 20 into which padlock shackle (not shown) is inserted
24 Domed first side of compression capping plate 30
26 Second side of dome compression capping plate 30
28 Annular axial hole of domed compression capping plate 30
30 Domed compression capping plate
32 Axial downwardly facing internal first shoulder of capping compression plate 30
40 Annular elastomeric sealing gasket
42 Flange of gasket 40
43 First side of flange of gasket 40
44 Interior volume of gasket 40
46 Sleeve of gasket 40
50 Compression base plate
52 Flange of base compression plate 50
54 Axial, downwardly facing, external shoulder of base compression plate 50
56 Threaded central bore of base compression plate 50
58 Axial, upwardly facing, internal shoulder of base compression plate 50
60 First side of compression base plate 50
62 Second side of compression base plate 50
64 Axial borehole of compression base plate 50
70 Well casing sealed by lockable hermetically sealing assembly 10

It should be understood that the drawings are not necessarily to scale. In certain instances, details which are not necessary for an understanding of the present invention or which render other details difficult to perceive may have been omitted. It should be understood, of course, that the invention is not limited to the particular embodiments illustrated herein, but encompasses many embodiments as are discussed throughout the specification.

DETAILED DESCRIPTION

Referring now particularly to the drawings, FIG. 1 shows a perspective exploded view of an exemplary embodiment of this invention and demonstrates how the above mentioned disadvantages have been overcome. It should be noted that the disclosed invention is disposed to embodiments in various sizes, shapes, and forms. Therefore, the embodiments described herein are provided with the understanding that the present disclosure is intended as illustrative and is not intended to limit the invention to the embodiments described herein.

FIG. 1 illustrates the individual components of the reusable lockable hermetically sealing plug assembly 10 for sealing an opening in a part. The invention includes novel structure completely preventing liquids, or other matter, from passing through plug assembly 10 and, additionally, completely preventing removal of the plug assembly from the plugged opening as soon as the plug assembly is inserted into the opening to be sealed, the seal formed, and the assembly locked.

The components of the plug assembly illustrated in FIG. 1 are winged threaded bolt 12, capping compression plate 30 with locking means 20 integral to the capping compression plate, annular resilient elastomeric sealing gasket 40, and base compression plate 50. Wings 14 at a first end of winged threaded bolt 12 provide the operator of the sealing assembly a means to comfortably, but securely, grip the bolt to accomplish rotating the bolt to either tighten or loosen the seal. At a second end of bolt 12 is an optional tapered end that may include one or more apertures 18a and 18b. Apertures 18a and 18b may provide for hanging a variety of devices, such as hanging of a tool or, if the sealing plug assembly is used to seal a monitoring well, an instrument tethering device. Bolt 12 is threaded along most of its length. Threads 16 of bolt 12 will be engaged by complementary threads 56 in borehole 64 in compression base plate 50 to achieve a hermetic seal once the sealing plug assembly is positioned in the opening in a part to be sealed.

Figure 6:
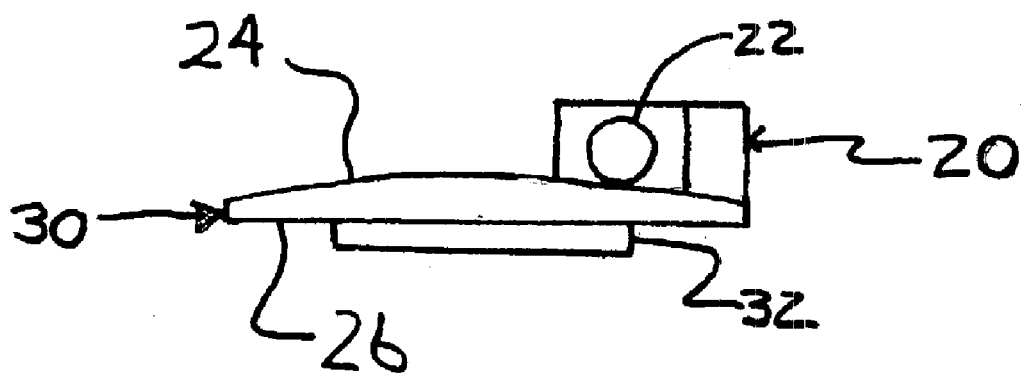
FIG. 6 is a side plan view of the top compression plate as illustrated in FIGS. 1–5.

Further illustrated in FIG. 1 is domed capping compression plate 30 having domed first side 24, second side 26, aperture 28, and, in this embodiment, t-style ear-lug locking means 20 integral to first domed side 24 of capping plate 30. Note that locking means 20 has aperture 22 through which the shackle of a padlock (not shown) is inserted for locking sealing assembly 10. The "dome" of domed capping compression plate 30 is only fractions of a millimeter and, at the scale the sealing plug assembly is illustrated in FIG. 1, is not visible. In FIGS. 2–4, 6, and 7 the doming is exaggerated and, thus, can be appreciated. The plate part of capping compression plate 30 that is bounded by domed first side 24 and second side 26 has an outer diameter greater than said opening in a part to be sealed, thereby permitting the sealing assembly to be supported by the rim of the opening to be sealed. Referring now to FIG. 6, axial downwardly facing internal first shoulder 32 is shown as it appears on second side 26 of capping compression plate 30. It should be noted that axial downwardly facing internal first shoulder 32 is manufactured integral with compression plate 30. The outer diameter of axial downwardly facing internal first shoulder 32 is complementary to the inner diameter of gasket 40, which is discussed in detail below. Axial downwardly facing internal first shoulder 32 provides lateral support for gasket 40 especially while gasket 40 is under compression (which compression is discussed more fully below). Additionally, the lateral support provided by first shoulder 32 ensures the integrity of gasket 40 while gasket 40 is under compression.

Still looking at FIG. 1, annular elastomeric sealing gasket 40 is illustrated just below winged threaded bolt 12. Sealing gasket 40 comprises hollow sleeve 46 having flange 42 at a first end. Flange 42 has an outer diameter greater than said opening in a part to be sealed, which provides for two advantages. The first is that the size of the outer diameter of the gasket's flange permits gasket 40 to be supported by the rim of the opening to be sealed, and secondly, but no less important, the flange provides for a compressible, moldable seal between the second side of capping compression plate 30 and the rim of the opening to be sealed. This compressible seal deforms itself to the irregularities often present on the surface of the rim of the opening to be sealed, ensuring the formation of a water and air-tight seal. First side 43 of flange 42 faces second side 26 of capping compression plate 30, which plate supplies counter support for gasket 40 while gasket 40 is in the state of compression, while the inner annular surface of flange 42 and the inner annular surface of the hollow sleeve 46, that is immediately adjacent to the inner annular surface of flange 42, receive support from axial downwardly facing internal first shoulder 32 on second side 26 of capping compression plate 30. The second end of hollow sleeve 46 faces compression base plate 50, which is described next.

Compression base plate 50 comprises borehole 64 having threads 56, flange 52 having first side 60 and second side 62, axial, upwardly facing, internal shoulder 58 and axial downward facing, external shoulder 54. It should be noted that all of the parts of compression base plate 50 just described are manufactured integral with compression base plate 50. First side 60 of flange 52 provides a supporting surface for gasket 40. The outer diameter of axial, upwardly facing internal shoulder 58 is complementary to the inner diameter of gasket 40. Axial, upwardly facing, internal shoulder 58 provides lateral support to the second end of hollow sleeve 46 of gasket 40 especially while gasket 40 is under compression. Additionally, the lateral support provided by shoulder 58 ensures the integrity of gasket 40 while gasket 40 is under compression. Axial, downward facing, external shoulder 54 also provides support for gasket 40, especially when gasket 40 is under compressive pressure, and importantly presents the annular, inner surfaces threads 56 that are complementary to threads 16 of winged threaded bolt 12. It should be noted that it is the action of threads 16 with threads 56 that urge the compression plates toward one another to compress gasket 40.

As is indicated by the vertical arrows illustrated in FIG. 1, to achieve workable sealing plug assembly 10, winged threaded bolt 12 is inserted sequentially into aperture 28 of capping compression plate 30, the interior empty volume 44 of gasket 40, and into the borehole 64 of compression base plate 50 to reach threads 56. Once threaded winged bolt 12 reaches complementary threads 56, winged threaded bolt 12 must be rotated toward the compression plates for threads 16 of bolt 12 to mesh with complementary threads 56 inside borehole 64. Continued rotation of winged threaded bolt 12 urges compression plates 30 and 50 toward one another compressing, and thus expanding, gasket 40.

Figure 2:
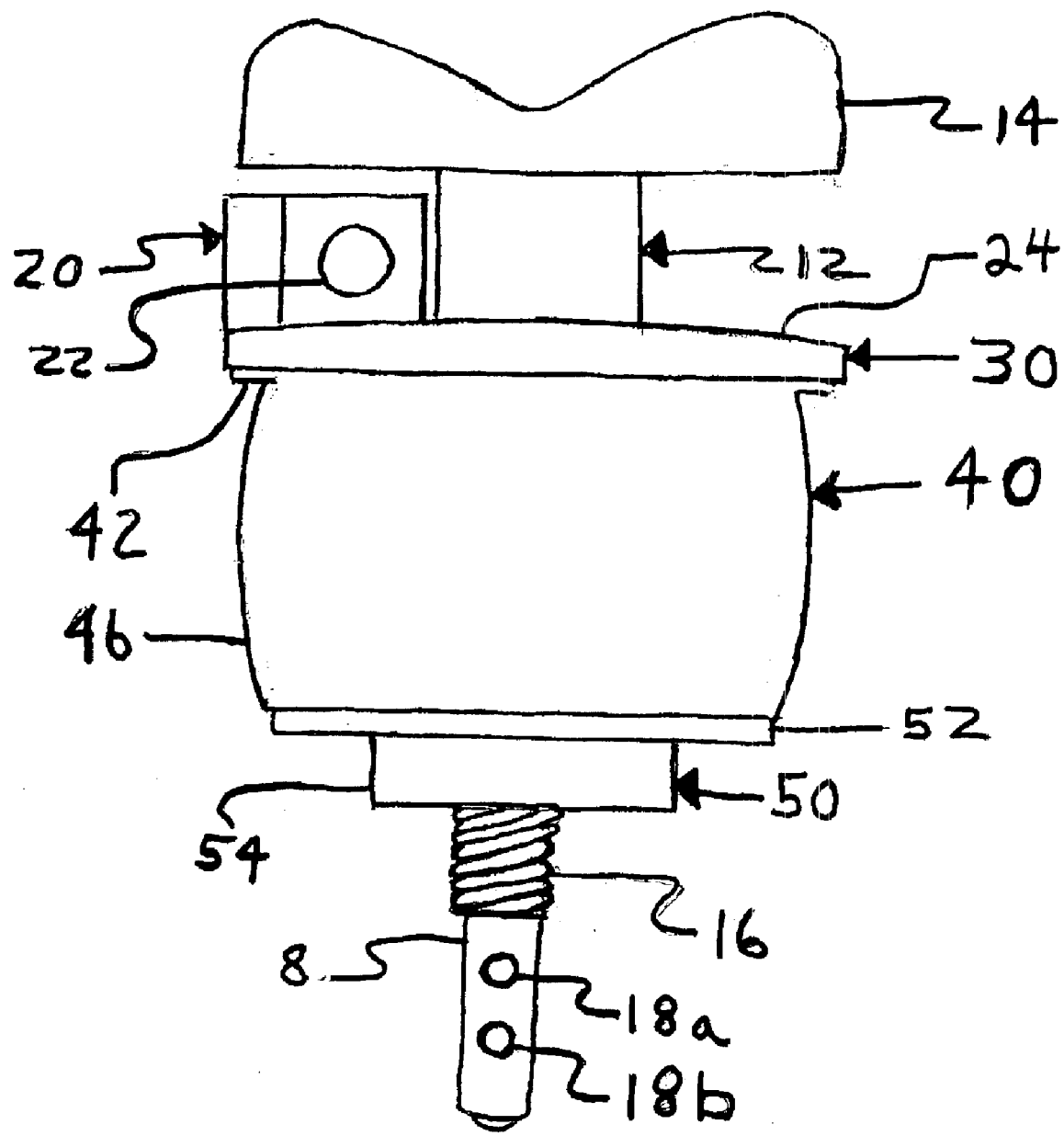
FIG. 2 is a front plan view of the plug assembly, as shown in FIG. 1.
Figure 3:
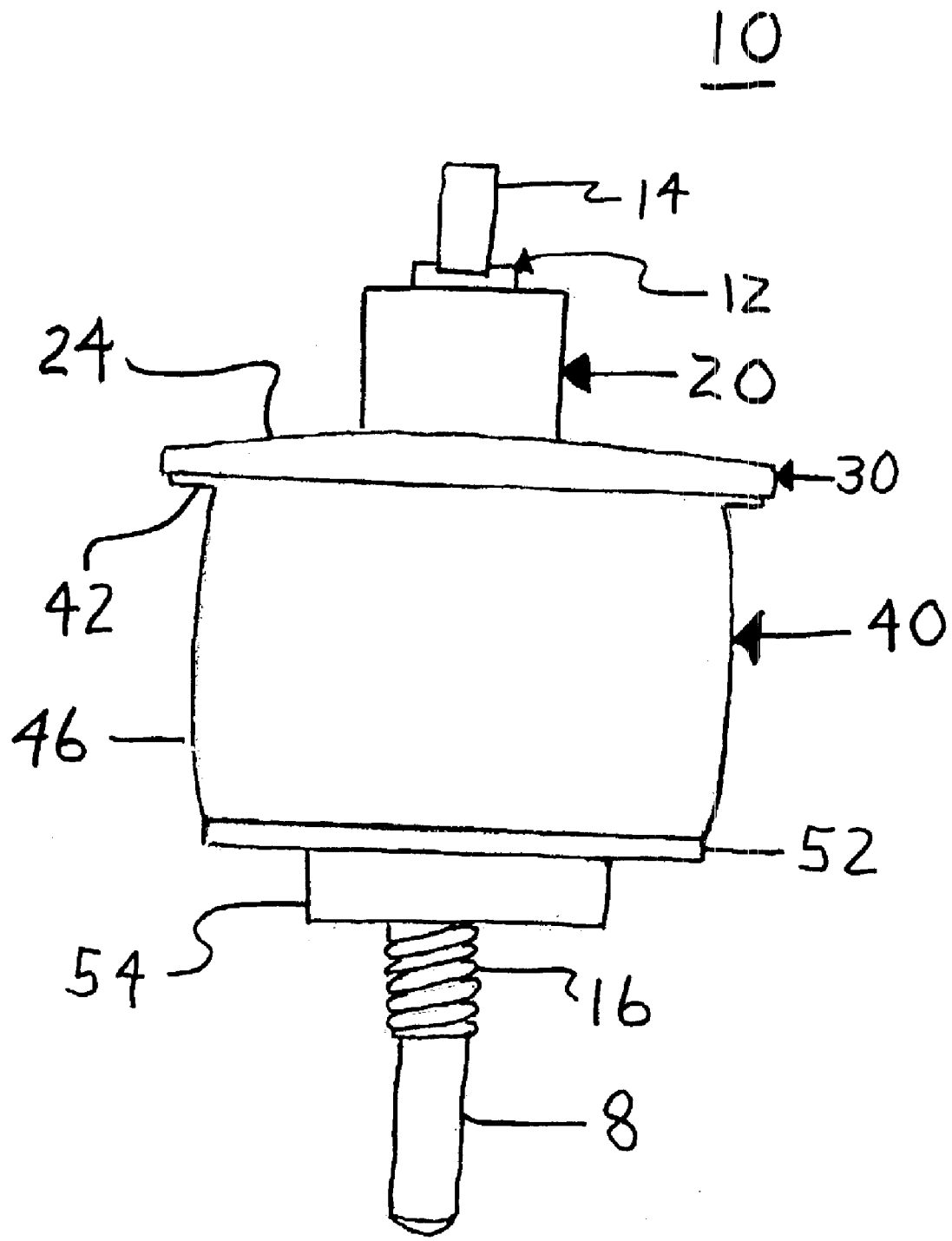
FIG. 3 is a side plan view of the plug assembly, as shown in FIG. 1, turned 90 degrees counterclockwise relative to the position of the plug assembly as shown in FIG. 2.
Figure 4:
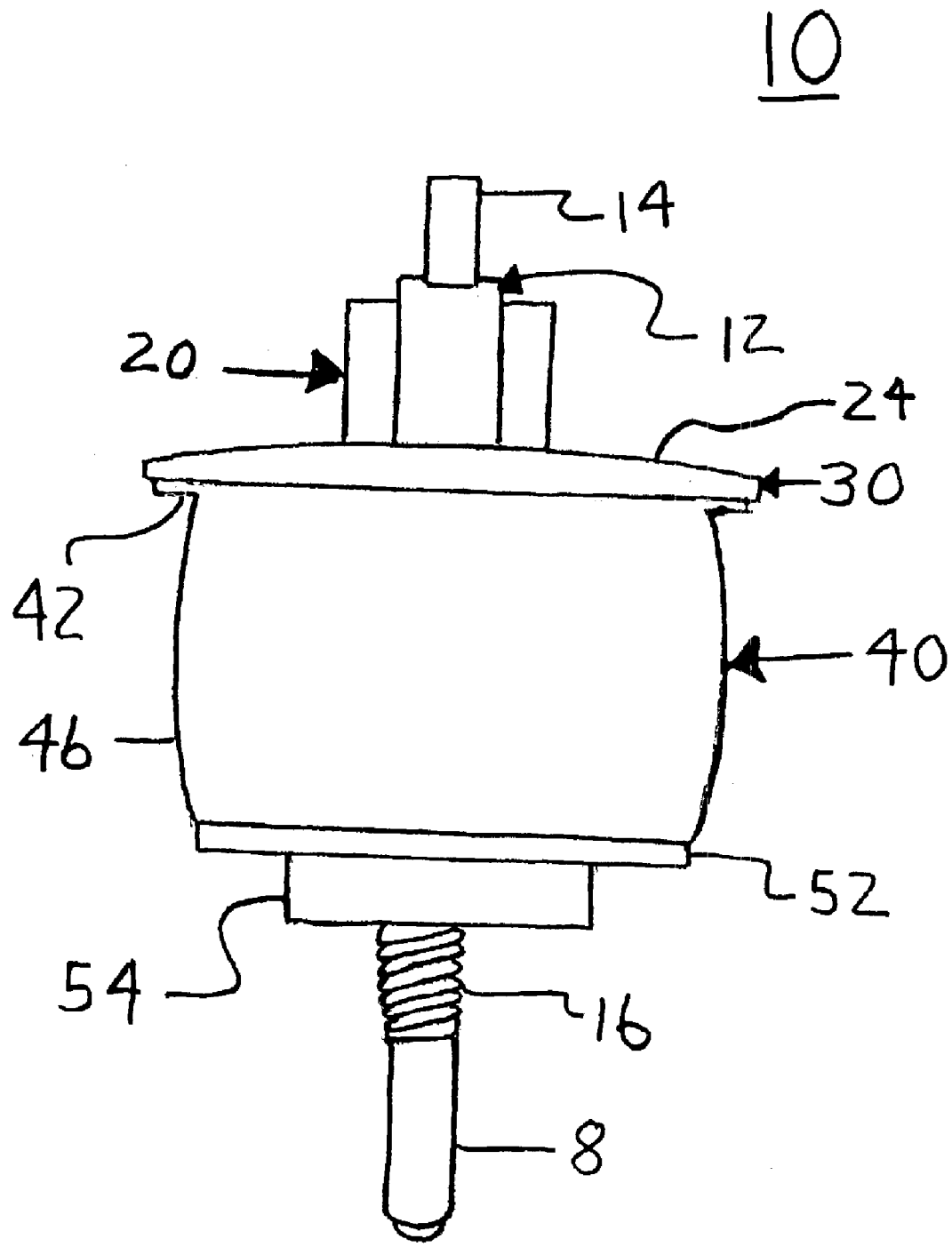
FIG. 4 is a side plan view of the plug assembly, as shown in FIG. 1, turned 90 degrees clockwise relative to the position of the plug assembly as shown in FIG. 2.

Gasket 40, compressed and expanded by compression plates 30 and 50, is illustrated as a planar front view in FIG. 2. FIGS. 3 and 4 illustrate gasket 40 in a compressed and expanded state as planar views of sealing plug assembly 10, where sealing plug assembly 10 has been rotated 90 degrees counterclockwise and clockwise, respectively.

Figure 5:
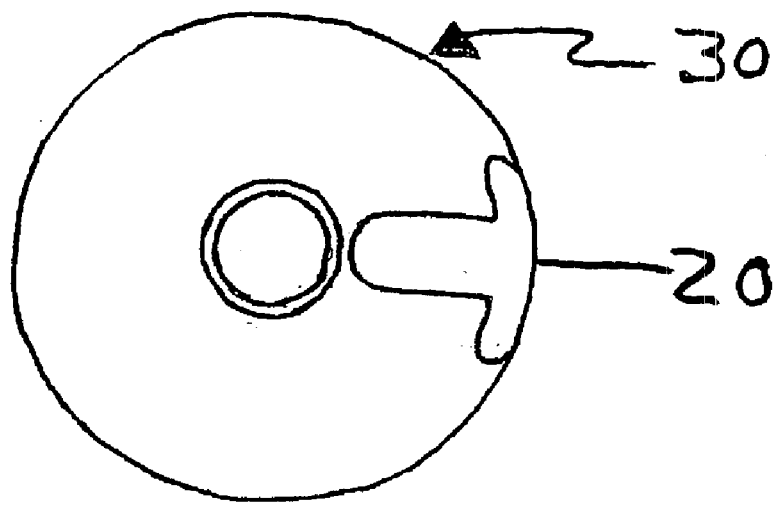
FIG. 5 is a top plan view of the top compression plate as illustrated in FIGS. 1–4.

A top plan view of t-shaped ear-lug locking means 20 which locking means are integral with first side of capping compression plate 30 is illustrated in FIG. 5. In FIG. 6, a side plan view of capping compression plate 30 shows both t-shaped ear-lug locking means 20 with aperture 22 through which the shackle of a padlock (not shown) is inserted for locking sealing assembly 10 and domed first surface 24 of capping compression plate 30.

The preferred plug assembly body, comprising winged threaded bolt 12, capping compression plate 30 with ear-lug locking means 20, and base compression plate 50, is reusable, if desired. Sealing plug assembly body is easily and inexpensively manufactured by injection molding using a variety of thermoplastics, including, but not limited to, polyvinyl chloride, Teflon, Nylon and glass filled Nylon, Valox and glass filled Valox.

Annular resilient elastomeric sealing gasket 40 is also reusable, if desired. Sealing gasket 40 is easily and inexpensively manufactured by injection molding using a variety of thermoplastic materials having appropriate properties, such as hardness, resiliency, resistance to heat and cold, and resistance to the corrosive effect of certain liquids. The thermoplastics that can be used, include, but not limited to, Santoprene, natural or man-made rubber, Viton and Buna Nitrile. The preferred embodiment of gasket 40 was manufactured with the required hardness as measured by a durometer, wall thickness, and length to obtain maximum compression and to achieve the maximum contact area between sleeve 46 of gasket 40 and the interior surface of the device whose opening is to be sealed in order to ensure the formation of a hermetic seal and to prohibit the sealing plug assembly from becoming dislodged from forces incurred during use.

Compressible sealing plug assemblies made according to this invention may be of any suitable size and configuration required to achieve a hermetic seal with an opening in a part, as required or desired.

The compressible plug assemblies according to the invention are advantageous because they cannot be dislodged from an opening by the expanding gas, liquid, or solid forces within a heated or cooled part with an opening to be sealed. In addition, the elastomeric, resilient, compressible sealing gasket can form a hermetic seal with an opening even when the opening is threaded; because the gasket is made of material which can conform to the spaces inherent in a threaded surface.

Figure 7:
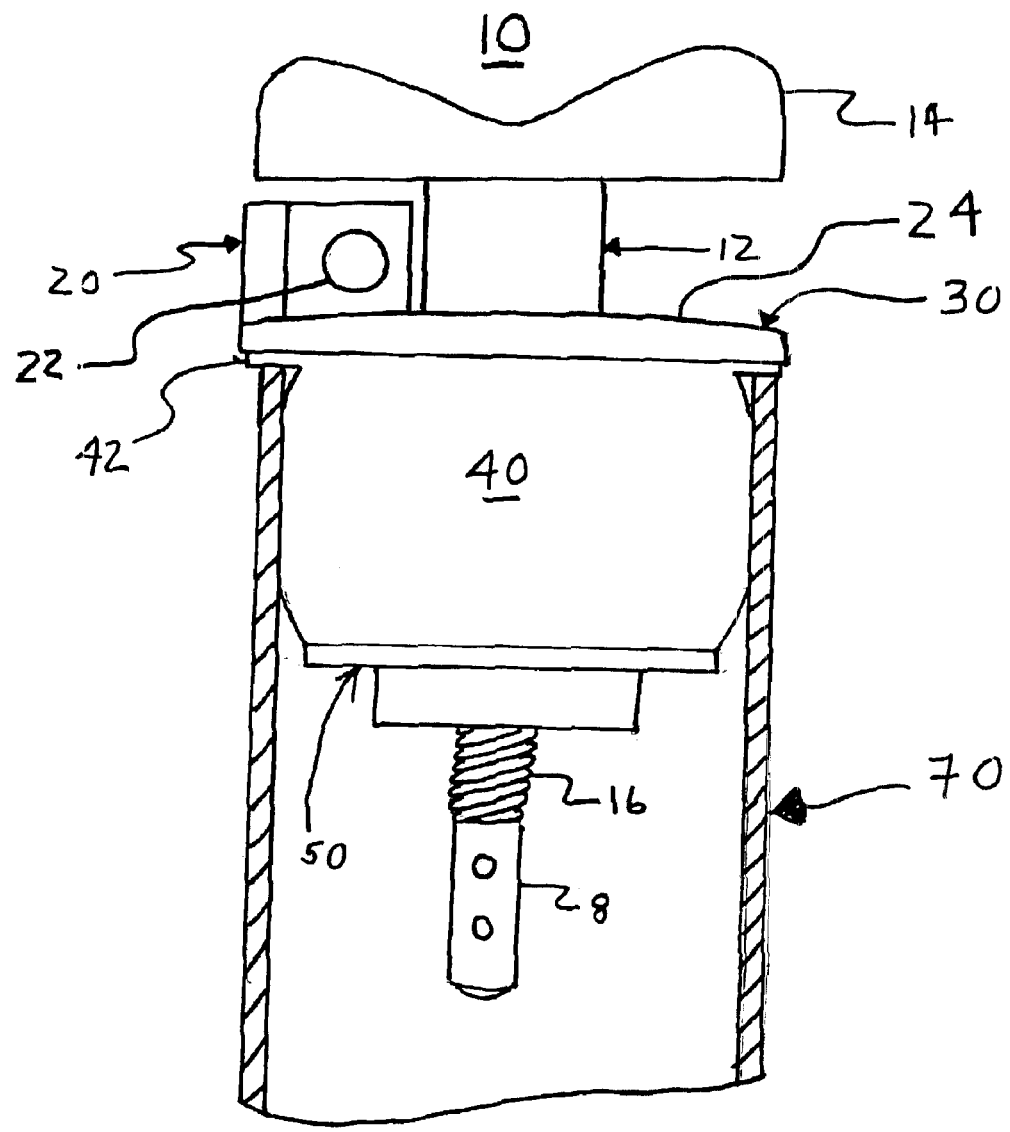
FIG. 7 is a part side plan view and a part section view of the plug assembly installed in an opening in a pipe.

FIG. 7 illustrates how the sealing plug assembly 10 is used to create a hermetic seal between the inside diameter of an opening to be sealed, such as a well or a plumbing pipe, for example and the outside diameter of the compressed sealing gasket.

In particular, one way to use lockable sealing plug assembly 10 to hermetically seal an opening in a part, is to first assemble the sealing plug assembly for insertion into the opening to be sealed. To do this, one could first position and rotate winged threaded bolt 12 sequentially into:

(1) annular axial hole 28 of first side 24 of compression capping plate 30, (2) sealing gasket 40 with central opening through which winged threaded bolt 12 passes, and where gasket 40 has a first end having a flange and a second end, and finally into (3) compression base plate 50 having a first and a second side and a threaded axial bore for receiving the threaded part of said threaded wing bolt.

Then, assembled plug assembly is inserted into the opening to be sealed. After the plug assembly is inserted into the opening to be sealed, rotate threaded wing bolt 12, further toward the compression plates. This action urges the capping plate and the base plate toward one another, thus compressing gasket 40 between the compression plates causing gasket 40 to deform radially outward providing a hermetic seal in the opening to be sealed. Additionally, expanding the gasket circumferentially ensures that a sufficient portion of the gaskets outer surface will firmly engage the inner surface of the opening in a part to be sealed creating a secure fit, preventing the plug assembly from becoming dislodged during use. The outward deformation of the gasket also provides frictional forces which contribute to the stability of the plug assembly in the opening.

Until winged threaded bolt 12 is rotated away from the plates, thus reducing the compressive force on the gasket, the sealing plug cannot be removed, from either the inside or the outside of the opening that is sealed. This means that neither pressures from the inside of the sealed part, such as those produced when heated gas expands, nor pulling pressure from the outside will result in removing the plug.

Obviously, what is needed is a means to prevent winged threaded bolt 12 from being rotated away from the plates by any but an authorized person. The present invention discloses locking means that meet that need. Ear-lug locking tab 20, manufactured integral with first side of said capping compression plate 30, has aperture 22 for receiving a shackle of a padlock. Once the shackle of a padlock is inserted into aperture 22, it is impossible to rotate threaded bolt 12 in either direction. In the embodiment illustrated, especially referring to FIGS. 1 and 5, it can be appreciated that the "t" part of t-shaped locking tab 22 prevents an attached padlock from being placed in a position that would allow rotation of winged threaded bolt 12. Therefore, once the padlock shackle is inserted into aperture 22 and the shackle is placed into the locked position, the sealing plug assembly is secure in the sealed opening providing a hermetic seal.

To remove the plug from the opening that is sealed, one need only unlock the padlock, remove the shackle of the padlock from the aperture of the ear-lug locking tab, using the wings of the winged threaded bolt, rotate the bolt away from the compression plates, thus releasing the compressive force on the sealing gasket, which allows the expanded gasket to un-expand to its original shape allowing for easy removal of the lockable compression plug assembly from the opening that was sealed.

Although the embodiment described above, and illustrated in FIG. 7, discussed a compressible plug to be used to seal a monitoring well, or other well pipe, the invention is contemplated to be used to hermetically seal a number of different openings, including, but not limited to drain and vent pipes and in the pipe connections of a plumbing system. The plug assembly would be most useful in conducting mandated pressure tests, to plug bung holes, holes drilled into surfaces for various reasons, bottles, and end of pipe and other part openings that need to be coated with a material that cannot, for whatever reason, be applied onto the interior surface of the part to be coated. Another contemplated use in for sealing those pipes that are used for transporting items that are especially well-stored in pipe-like containers. This use would be especially useful for locking the pipe-like containers that so often must be left standing out in the open, such as when the pipe-like containers are anchored on the top of a truck meant to carry piping supplies, when that truck is parked in the street for some length of time.

Accordingly, the ways that the lockable compression plug assembly for hermetically sealing an opening in a part are used are limited only by the imagination of the user.

The foregoing description, for purposes of explanation, used specific and defined nomenclature to provide a thorough understanding of the invention. However, it will be apparent to one skilled in the art that the specific details are not required in order to practice the invention. Thus, the foregoing descriptions of the specific embodiment of the lockable compression plug are presented for purposes of illustration and description. They are not intended to be exhaustive or to limit the invention to the precise forms disclosed. Those skilled in the art will recognize that many changes may be made to the features, embodiments, and methods of making the embodiments of the invention described herein without departing from the spirit and scope of the invention. Furthermore, the present invention is not limited to the described methods, embodiments, features or combinations of features but include all the variation, methods, modifications, and combinations of features within the scope of the appended claims. The invention is limited only by the claims.

What is claimed is:

1. A sealing assembly lockable compression plug assembly for hermetically sealing an opening in a part, comprising:

a) a molded sealing assembly means for hermetically sealing said opening in a part; and b) a non-mechanical one piece molded locking assembly means for use with a padlock for locking said sealing assembly means in said opening in a part.

2. The lockable compression plug assembly, as recited in claim 1, wherein said sealing assembly means for hermetically sealing said opening in a part comprises:

a) a winged threaded bolt positioned and rotated into:

b) a compression capping plate having a first and a second side and an annular axial hole to receive said threaded wing bolt;

c) an elastomeric compressible resilient sealing gasket having a central opening through which said winged threaded bolt passes and a first end and a second end wherein said first end is flanged; and d) a compression base plate having a first and a second side and a threaded axial bore for receiving the threaded part of said threaded wing bolt;

wherein, the sealing assembly is inserted into said opening in a part, wherein said threaded wing bolt is further rotated toward the compression plates urging said capping compression plate and said base compression plate toward one another compressing said gasket between said compression plates causing said gasket to deform radially outward providing a hermetic seal in said opening in a part.

3. The lockable compression plug assembly, as recited in claim 2, wherein said locking assembly means for locking said sealing assembly means in said opening in a part comprises:

a locking tab molded in one piece with said capping compression plate, said locking tab functionally positioned on said first side of said capping compression plate, when said locking tab having an aperture to receive a shackle of a padlock;

wherein inserting said shackle of said padlock into said aperture and locking said padlock prevents rotation of the winged threaded bolt securing said sealing plug assembly in said opening in a part.

4. The lockable compression plug assembly, as recited in claim 3, wherein the compression capping plate is domed preventing fluids from residing on the outer surface of said capping plate.

5. The lockable compression plug assembly, as recited in claim 3, wherein said compression capping plate has an outer diameter greater than said opening to be sealed.

6. The lockable compression plug assembly, as recited in claim 3, wherein said flange of said sealing gasket has a first side, with said first flange side positioned adjacent to said second side of capping compression plate, with said flange having an outer diameter greater than said opening to be sealed.

7. The lockable compression plug assembly, as recited in claim 6, wherein said sealing gasket comprises an elongate sleeve-like body, wherein said body has an outer diameter selected for complemental fitting of said gasket body inside said opening to be sealed.

8. The lockable compression plug assembly, as recited in claim 3, wherein said threaded wing bolt has a tapered end, wherein said tapered end has at least one aperture.

9. The lockable compression plug assembly, as recited in claim 3, wherein said opening in a part to be sealed has an inner surface into which the sealing assembly is inserted;

wherein said deformed outward gasket provides radially outward forces directed towards said inner surface of said opening to be sealed;

wherein said outward forces prohibit the removal of the sealing assembly from the opening to be sealed.

10. The lockable compression plug assembly, as recited in claim 3, wherein said lockable compression plug assembly is reusable.

11. The lockable compression plug assembly, as recited in claim 3, wherein said opening in a part is an opening in a monitoring well casing extending from an area below ground.

12. The lockable compression plug assembly, as recited in claim 3, wherein said opening in a part is an opening in a water well casing extending from an area below ground.

13. The lockable compression plug assembly, as recited in claim 3, wherein said opening in a part is an opening in an oil well casing extending from an area below ground.

14. The lockable compression plug assembly, as recited in claim 3, wherein said opening in a part is an opening in a pipe in a plumbing system.

15. The lockable compression plug assembly, as recited in claim 3, wherein said opening in a part is an opening in a bottle.

16. The lockable compression plug assembly, as recited in claim 3, wherein said opening in a part is a bung hole.

17. The lockable compression plug assembly, as recited in claim 3, wherein said opening in a part is an opening in a part to be coated.

18. A method for hermetically sealing an opening in a part using a sealing assembly lockable compression plug assembly, comprising the steps of:

a) providing a molded sealing assembly means;

b) providing a non-mechanical one piece molded locking assembly means for use with a padlock;

c) sealing said opening in a part with said sealing assembly means; and d) locking said sealing assembly means in said opening in a part.

19. The method, according to claim 18, for hermetically sealing an opening in a part using said lockable compression plug assembly, further comprising the steps of:

a) positioning and rotating a winged threaded bolt into:
a compression capping plate having a first and a second side and an annular axial hole to receive said threaded wing bolt;
an elastomeric compressible resilient sealing gasket having a central opening through which said winged threaded bolt passes and a first end and a second end wherein said first end is flanged; and
a compression base plate having a first and a second side and a threaded axial bore for receiving the threaded part of said threaded wing bolt;
wherein assembled sealing plug assembly into said opening to be sealed; and b) inserting sealing assembly into said opening in a part; and c) rotating threaded wing bolt further toward the compression plates urging said capping compression plate and said base compression plate toward one another compressing said gasket between said compression plates causing said gasket to deform radially outward providing a hermetic seal in said opening in a part.

20. The method, according to claim 18, for locking said sealing assembly means in an opening in a part using said lockable assembly means, further comprising the steps of:

a) providing a locking tab molded in one piece with said capping compression plate, said locking tab functionally positioned on said first side of said capping compression plate;

b) providing said locking tab an aperture to receive a shackle of a padlock;

c) inserting said shackle of said padlock into said aperture, and d) locking said padlock which prevents rotation of the winged threaded bolt securing said sealing plug assembly in said opening in a part.

* * * * *

UNITED STATES PATENT AND TRADEMARK OFFICE
CERTIFICATE OF CORRECTION

PATENT NO. : 6,883,546 B1
DATED : April 26, 2005
INVENTOR(S) : Thomas E. Kobylinski It is certified that error appears in the above-identified patent and that said Letters Patent is hereby corrected as shown below:

Column 10,
Line 66, claim 3 should read:
The lockable compression plug assembly, as recited in Claim 2, wherein said locking assembly means for locking said sealing assembly means in said opening in a part comprises:
a locking tab molded in one piece with said capping compression plate, said locking tab functionally positioned on said first side of said capping compression plate, WITH said locking tab having an aperture to receive a shackle of a padlock;
wherein inserting said shackle of said padlock into said aperture and locking said padlock prevents rotation of the winged threaded bolt securing said sealing plug assembly in said opening in a part.

Signed and Sealed this

Thirteenth Day of September, 2005

JON W. DUDAS
*Director of the United States Patent and Trademark Office*